B. W. KADEL & J. A. PILCHER.
BRAKE ARRANGEMENT FOR SIX WHEEL CAR TRUCKS.
APPLICATION FILED JAN. 17, 1916.

1,201,310.  Patented Oct. 17, 1916.

Witnesses

Inventors
B. W. Kadel
John A. Pilcher.

UNITED STATES PATENT OFFICE.

BYERS W. KADEL AND JOHN A. PILCHER, OF ROANOKE, VIRGINIA.

BRAKE ARRANGEMENT FOR SIX-WHEEL CAR-TRUCKS.

1,201,310. Specification of Letters Patent. Patented Oct. 17, 1916.

Application filed January 17, 1916. Serial No. 72,393.

*To all whom it may concern:*

Be it known that we, BYERS W. KADEL and JOHN A. PILCHER, citizens of the United States, residing at Roanoke, in the county of Roanoke and State of Virginia, have invented certain new and useful Improvements in Brake Arrangements for Six-Wheel Car-Trucks, of which the following is a specification.

This invention relates to braking means for six-wheel car trucks, and among the objects thereof is to provide a brake arrangement in which the braking members are disposed so as to admit of ready application, inspection and replacement, and with the actuating members so disposed as to avoid passing through the main truck members.

Another object is to provide an improved arrangement of lever and equalizing members.

A still further object is to provide an arrangement of the braking members that will admit of spacing the truck wheels close together and reducing the wheel base of the truck.

With these objects and others in view, the invention consists in the combination and arrangement of the various parts as will be herein described and as particularly claimed.

Figure 1:
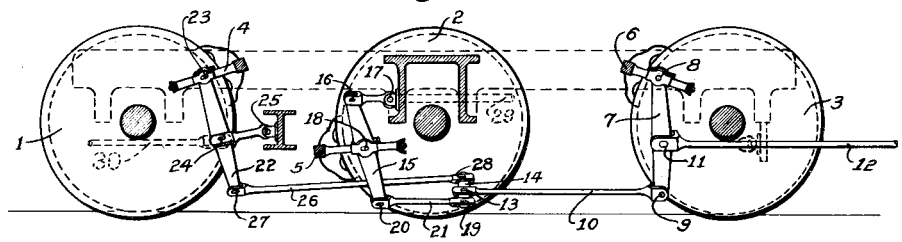
Figure 2:
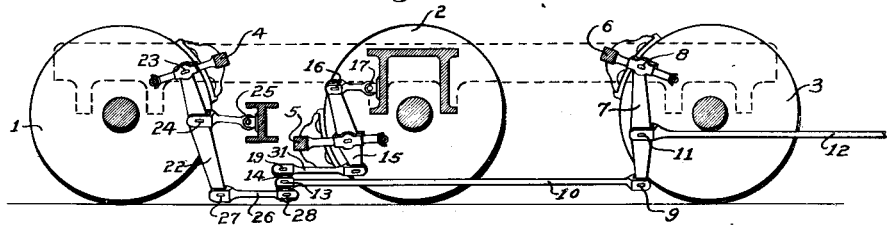
Figure 3:
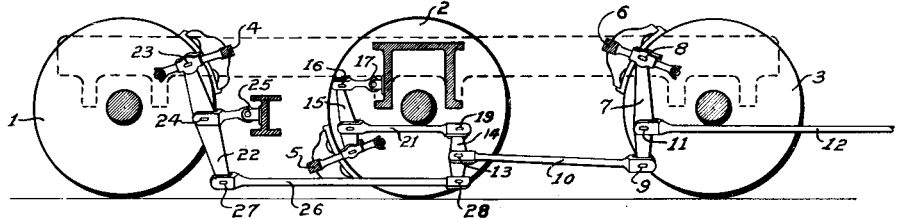

In the accompanying drawings, Figure 1 is a diagrammatical view showing a longitudinal, vertical section of a truck having brakes arranged in accordance with the present invention. Figs. 2 and 3 are similar views showing alternative means of connecting the lever-actuating members.

Referring now to these drawings, 1 represents the one end pair of truck wheels, 2 the middle pair of wheels and 3 the other end pair of wheels. For these pairs of wheels we supply, respectively, the brake beams 4, 5 and 6 with their customary attached parts such as brake heads and shoes, the shoes bearing on the periphery of the wheels in the usual manner. The beams for the end pair of wheels are located toward the center of the truck with respect to the periphery of these wheels, hence this brake system is what is customarily termed an inside brake arrangement. It is desirable in brake arrangements of this kind that the lever-actuating members be for the most part tension members and not compression members, for the reason that compression members, when of any considerable length, require larger sections of material and are subject to buckling and distortion. In our present brake arrangement we are enabled to use all tension members for these actuating means and furthermore have located the brake beams for the several pairs of wheels in such manner as to permit the use of rods or tension members for connecting the actuating levers, the disposition of the beams further being such as to permit the passage of these rods below the axles instead of through the main truck members above the axles. To attain these ends it is necessary that the planes of the brake beams be peculiarly arranged with respect to the wheel centers. The beams for the two end pairs of wheels are applied thereto with their planes above the centers of the wheels and the beam for the middle pair of wheels is applied to same with the plane thereof below the center of those wheels. The planes of the end brake beams are furthermore preferably slightly inclined from the end toward the center of the truck. It has heretofore been customary with inside hung brakes, to apply these end beams with the planes thereof below the wheel centers and usually slightly declining from the end toward the center of the truck. There is then frequently a tendency when the brakes are applied to increase the load on the truck springs. By locating the beams above the wheel centers and slightly inclining them the two end beams react against each other through the truck bolster and tend slightly to relieve the load on the truck springs, thereby avoiding undue loads on the same. This disposition of the brake beams so disposes the plane of the middle brake beam 5 and the plane of the adjacent end brake beam 4 with respect to each other that they do not intersect or coincide within the limits of these beams in their various positions of travel. These beams may therefore overlap each other longitudinally of the truck and the wheels consequently spaced considerably closer together than were these beams located in the same longitudinal plane or to strike each other when released from the wheels. At the same time the middle brake beam being located below the middle wheels allows space for the customary heavy center bolster construction of such trucks, while the brake heads of the end beams are removed from the restricted space adjacent to and needed for occupancy by the main truck members and these otherwise hidden heads and shoes are elevated to a position where they may be easily applied, inspected and replaced.

For applying the loads to the beams so arranged and for equalizing these loads among the various beams, we have provided an improved arrangement of levers and lever-actuating members as follows: For the beam 6 for the end pair of wheels 3 we provide a lever 7 which is fulcrumed at its upper extremity at 8 to the said beam and to the other extremity of which at 9 there is pivotally connected one end of a lever-actuating member or pull rod 10. Intermediate of these extremities, at 11, is a fulcrum point for this brake lever, and connected thereto is a lever-actuating member or tension rod 12 which connects the system of brake levers with the source of braking power on the car body. The other end of the lever-actuating member 10 is pivotally connected at 13 to the equalizing lever 14 between the extremities thereof. A second brake lever 15 is supplied for the brake beam 5 for the middle pair of wheels and this brake lever is provided with a fulcrum point 16 at its upper extremity, the same being here fulcrumed to a rod which is in turn pivotally connected at 17 to some convenient point of the car body or truck. The brake beam 5 is pivotally connected to this brake lever 15 intermediate of the extremities of the said lever at 18, and extending between the one extremity 19 of the equalizing lever 14 and the lower extremity 20 of this brake lever 15 is a second lever-actuating member or pull rod 21. For the third brake beam 4 there is supplied a third brake lever 22, the beam being connected to the upper extremity of this lever 22 at 23 and the lever having a fulcrum point 24 between its extremities. At the point 24 this lever is fulcrumed to a strut which is in turn pivotally connected at 25 to some convenient part of the car body or truck. A third lever-actuating member or tension member 26 connects the lower extremity 27 of this brake lever with the other extremity 28 of the equalizing lever. It will now be seen that when a force is applied to the first brake lever 7 at the point 11 by means of the rod 12 the shoes on the beam 6 will be drawn against the wheels 3 and the lever 7, fulcruming about the point 8 will exert a pull in the rod 10 which in turn, by means of the equalizing lever 14, will divide this pull between the rods 21 and 26 and thereby apply the shoes on the brake beams 5 and 4 to their respective pairs of wheels. As is usual in such systems of levers, the braking power from the car body may be applied to the system of levers at any lever fulcrum point such as 11, 16 or 24 and in Fig. 1 is shown in dotted lines how pull rods 29 or 30 might be applied to either of these lever fulcrum points and either of these points used as the point of application of the load, the other two being fulcrumed to convenient parts of the car or truck.

It will be noted that the lever system now employed with our peculiar arrangement of brake beams is such that the two end levers are inverted, with the beams 4 and 6 pivoted thereto at the upper extremities of the said levers and with the lever below the end brake beams. The middle beam may be connected to its lever in any approved manner, but it is desirable that these end beams be connected at the tops of their respective levers so that correct relationship may be obtained between the various load equalizing and applying means.

We have shown in Fig. 2 how a short compression member 31 might be used instead of the tension member 21 by simply shifting the position of the equalizing lever 14. It will be realized that in this there has been no departure from our system of levers and lever-actuating members.

In Fig. 3 we have shown how the tension rod 21 might be applied to the lever 15 between the extremities thereof instead of immediately at the lower extremity, this likewise being no departure from our system of levers and actuating members, but being a point chosen along the lever for the purpose of equalization of loads.

Thus we have supplied an arrangement of brake beams that possesses many advantages over preceding arrangements and for use with the same we have further provided improved actuating means wherein all the actuating members may be tension members and wherein these tension members are located under the truck axles, down close to the rail, instead of requiring to be passed through the customary bolster construction above the car axles.

Having thus described our invention we claim:

1. In a brake arrangement for six-wheel car trucks, three brake beams each of which is adapted to serve one of the pairs of truck wheels, the beams for the two end pairs of wheels being applied thereto above the centers of the wheels and the beam for the middle pair of wheels being applied to the same below the center of such wheels, and a system of levers and lever-actuating members whereby the said beams may be forced against their respective pairs of wheels.

2. In a brake arrangement for six-wheel car trucks, three brake beams each of which is adapted to serve one of the pairs of truck wheels, the beams for the two end pairs of wheels being applied thereto with their planes above the centers of the wheels and being located toward the center of the truck with respect to the periphery of the end wheels and the beam for the middle pair of wheels being applied to the same with its plane below the center of such wheels, the planes of the middle and the adjacent end brake beam being at different heights and so disposed as to not intersect or coincide with each other within the limits of the said beams, and a system of levers and lever-actuating members whereby the said beams may be forced against their respective pairs of wheels.

3. In a brake arrangement for six-wheel car trucks, three brake beams each of which is adapted to serve one of the pairs of truck wheels, a brake lever for each of the said brake beams, the brake beams for the two end pairs of wheels being applied thereto with their planes above the centers of the wheels and the beam for the middle pair of wheels being applied to the same with its plane below the center of such wheels, the end brake beams being pivoted to their levers at the upper extremities of said levers, actuating and equalizing means connecting the said levers and means for actuating the same from the brake mechanism on the car body.

4. In a brake arrangement for six-wheel car trucks, three brake beams, each of which is adapted to serve one of the pairs of truck wheels, the beams for the two end pairs of wheels being disposed in planes which are located above the wheel centers and which are each slightly inclined from the end toward the center of the truck, the beams for the middle pair of wheels being disposed in a plane below the wheel centers, a system of levers and lever-actuating members whereby the beams may be forced into braking relationship with the truck wheels and through which braking power may be equalized between the said beams, a source of braking power, and means for transmitting said braking power to the said system of levers and rods.

5. In a brake arrangement for six-wheel car trucks, a brake beam adapted to brake an end pair of wheels, a lever fulcrumed at one extremity to the said brake beam, a fulcrum point for the said brake lever between the extremities thereof, a lever-actuating member pivotally connected at one end to the other extremity of said brake lever, an equalizing lever to which is pivotally connected the other end of said lever-actuating member, a second brake beam adapted to brake the middle pair of wheels, a second brake lever therefor having a fulcrum point at one of its extremities and to which is pivotally connected at a point removed from that extremity the said brake beam, a second lever-actuating member pivotally connected at one end to the said equalizing lever and at its other end to the said second brake lever and being adapted to actuate the same, a third brake beam adapted to brake the other end pair of wheels, a third brake lever pivotally connected at one extremity to said third brake beam, a fulcrum point for said third brake lever between the extremities thereof, a third lever-actuating member adapted to actuate the said third brake lever and having one end pivotally connected thereto at the other extremity of said third brake lever, the other end of said third lever-actuating member being pivotally connected to the said equalizing lever, a source of braking power, a lever-actuating member extending from the said source of power to the said brake arrangement, it being pivotally connected to one of the said three brake levers at the said fulcrum point thereof, the similar fulcrum points of the remaining two brake levers being pivoted to convenient parts of the truck.

6. In a brake arrangement for six-wheel car trucks, a brake beam adapted to brake an end pair of wheels, a lever fulcrumed at one extremity to the said brake beam, a fulcrum point for the said brake lever between the extremities thereof, a tension member pivotally connected at one end to the other extremity of said brake lever, an equalizing lever to which is pivotally connected between its extremities the other end of said tension member, a second brake beam adapted to brake the middle pair of wheels, a second brake lever therefor having a fulcrum point at one of its extremities and to which is pivotally connected between its extremities the said second brake beam, a second tension member pivotally connected at one end to one extremity of the said second brake lever and being adapted to actuate the same, a third brake beam adapted to brake the other end pair of wheels, a third brake lever pivotally connected at one extremity to said third brake beam, a fulcrum point for said third brake lever between the extremities thereof, a third tension member adapted to actuate the said third brake lever and having one end pivotally connected thereto at the other extremity of the said third brake lever, the other end of said third tension member being pivotally connected to the other extremity of the said equalizing lever, a source of braking power, a tension member extending from the said source of power to the said brake arrangement, it being pivotally connected to one of the said three brake levers at the said fulcrum point thereof, the similar fulcrum points of the remaining two brake levers being pivoted to convenient parts of the truck.

7. In a brake arrangement for six-wheel car trucks, a source of braking power, a brake beam adapted to brake an end pair of wheels, a lever fulcrumed at one extremity to the said brake beam, a lever-actuating member pivotally connected to the said lever between the extremities thereof and extending therefrom to the said source of braking power, a tension member pivotally connected at one end to the other extremity of said brake lever, an equalizing lever to which is pivotally connected between the extremities thereof the other end of said tension member, a second brake beam adapted to brake the middle pair of wheels, a second brake lever therefor, the same being fulcrumed at one of its extremities to some convenient part of the truck and to which is pivotally connected between its extremities the said second brake beam, a second tension member pivotally connected at one end to one extremity of the said equalizing lever and at its other end to the other extremity of the said second brake lever and being adapted to actuate the same, a third brake beam adapted to brake the other end pair of wheels, a third brake lever pivotally connected at one extremity to said third brake beam, the said third brake lever being fulcrumed between its extremities to some convenient part of the truck, and a third tension member adapted to actuate the said third brake lever and having one end pivotally connected thereto at the other extremity of said third brake lever, the other end of said third tension member being pivotally connected to the other extremity of the said equalizing lever.

8. In a brake arrangement for six-wheel car trucks, three brake beams each of which is adapted to serve one of the pairs of truck wheels, a brake lever for each of the said brake beams, the brake beams for the two end pairs of wheels being applied thereto with their planes above the centers of the wheels and the beam for the middle pair of wheels being applied to the same with its plane below the center of such wheels, the end brake beams being pivoted to their levers at the upper extremities of said levers, members for connecting and actuating the said levers, said members being disposed beneath the truck axles, a source of braking power, and means for transmitting said braking power to the said brake arrangement.

In testimony whereof we affix our signatures in presence of two witnesses.

BYERS W. KADEL.
JOHN A. PILCHER.

Witnesses:
A. K. SIMMONS,
G. F. KUMMERLING.